S. N. JESSUP.
REPLANTING HOE.
APPLICATION FILED AUG. 15, 1917.
1,263,677. Patented Apr. 23, 1918.
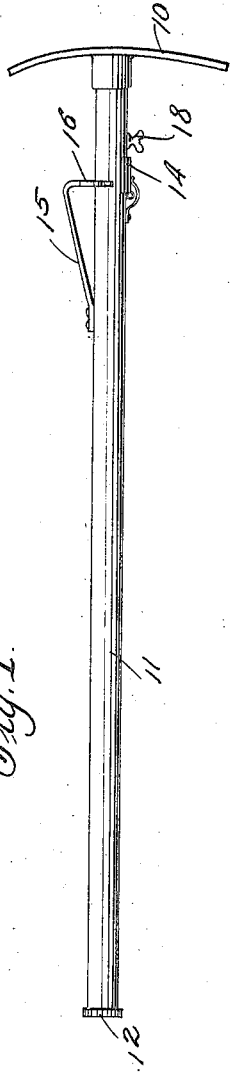
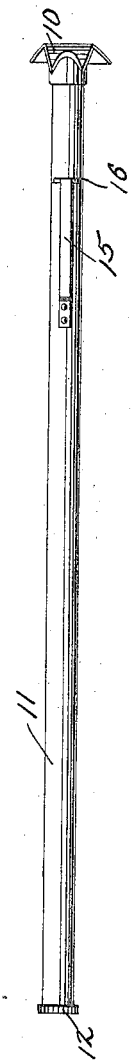
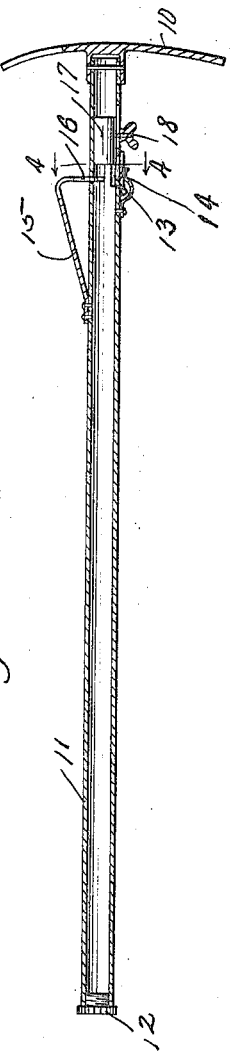
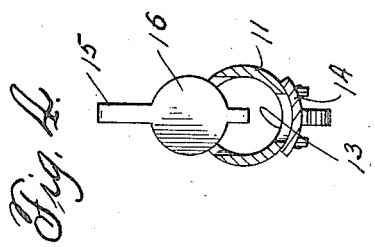
Inventor
S. N. Jessup

UNITED STATES PATENT OFFICE.

SAMUEL N. JESSUP, OF TURLOCK, CALIFORNIA.

REPLANTING-HOE.

1,263,677.  Specification of Letters Patent.  Patented Apr. 23, 1918.

Application filed August 15, 1917.  Serial No. 186,371.

*To all whom it may concern:*

Be it known that I, SAMUEL N. JESSUP, a citizen of the United States, residing at Turlock, in the county of Stanislaus, State of California, have invented certain new and useful Improvements in Replanting-Hoes; and I do hereby declare the following to be a full, clear, and exact description of the invention, such as will enable others skilled in the art to which it appertains to make and use the same.

This invention relates to improvements in planting devices and particularly to hand planting devices.

One object of the present invention is to provide a novel and simple device whereby replanting can be done in a quick and easy manner without the usual requirement of a second man to drop the seeds.

Another object of the present invention is to provide a simple device of this character whereby a hole can be formed in the place for the seed and the seed dropped thereinto in practically one operation.

Other objects and advantages will be apparent from the following description when taken in connection with the accompanying drawing.

In the drawing:

Figure 1 is a side elevation of a replanting hoe made in accordance with my invention.

Fig. 2 is a top plan view of the same.

Fig. 3 is a longitudinal sectional view taken on the line 3—3 of Fig. 2.

Fig. 4 is a vertical transverse sectional view taken on the line 4—4 of Fig. 3.

Referring particularly to the accompanying drawing 10 represents a hoe blade which is secured to a hollow handle 11. In the other end of this handle there is disposed a removable closure 12 in the form of a screw plug, and through this end of the handle the seeds are introduced thereinto. In the lower side of the attached end of the handle there is formed an opening 13 through which the seeds are discharged into the holes which are formed in the ground by the hoe blade. Closing this opening is a spring held door 14. Secured to the upper side of the handle is a spring arm 15 the outer end of which is turned downwardly, as at 16 and passes through the handle and bears against the said door. Upon pressing on the said arm the end 16 will force the door into open position and permit a quantity of seeds to drop through said opening. When said end opens the door the flow of seeds from the handle will be checked thereby, and only such seeds as are between the end 16 and the opening will drop therethrough. Slidable toward and away from the other end of the opening is a valve member 17 by means of which the quantity of seeds to be released can be quickly and easily regulated. A finger-piece 18 is carried by the valve member and projects through the lower side of the handle where it can be readily grasped and manipulated to move the valve.

Thus a person can dig a hole at the place where the first planting did not come up, and immediately drop the required number of seeds into the hole and afterward cover them up. Thus the work of two persons can be quickly and easily accomplished by one person.

What is claimed is:

1. A corn planting device including a tubular seed container having a seed discharging opening, a movable spring held closure for the opening, means movable toward and away from the closure for regulating the quantity of seed which flows from the container, and a resilient arm carried by and movable through the container and arranged to engage and move the closure into open position.

2. A corn planting device including a tubular seed container having a seed discharging opening in one side, a spring closed closure plate covering said opening, and a spring arm movable through the container and provided with means for unseating the closure.

3. A corn planting device including a tubular seed container having a discharge opening in one side, a plate disposed to cover the opening, a spring for holding the plate in covering position with respect to the opening, and a spring arm carried by and movable through the container and provided with a projection for engagement with the said plate to push the same into open position.

4. A corn planting device including a tubular seed container having a discharge opening in one side and a slot in the opposite side, a block slidable longitudinally in the container adjacent the discharge opening, means for holding the block in different longitudinal slidable positions to regulate the amount of seed discharged, a spring held closure plate covering the discharge opening, and a spring arm carried by the container adjacent the slot, said arm being provided with a disk portion which is movable through the slot to open the said closure plate and at the same time cut off the flow of seed.

In testimony whereof, I affix my signature in the presence of two witnesses.

SAMUEL N. JESSUP.

Witnesses:
D. J. WEDDLE,
A. S. CHILD.